(12) United States Patent
Saha et al.

(10) Patent No.: US 8,484,625 B2
(45) Date of Patent: Jul. 9, 2013

(54) METHOD AND APPARATUS TO VET AN EXECUTABLE PROGRAM USING A MODEL

(75) Inventors: Dipikalyan Saha, Kolkata (IN); Morris A. Moore, Austin, TX (US); Subir Saha, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 914 days.

(21) Appl. No.: 12/416,657

(22) Filed: Apr. 1, 2009

(65) Prior Publication Data

US 2010/0257253 A1 Oct. 7, 2010

(51) Int. Cl.
G06F 9/44 (2006.01)

(52) U.S. Cl.
USPC .......................................................... 717/135

(58) Field of Classification Search
USPC ........... 726/22, 24, 26; 714/25, 27, 46, 38.13, 714/703, 724, 47.2; 370/241, 252; 709/223–224, 220, 229; 702/122; 719/328; 717/168–178, 134–135
See application file for complete search history.

(56) References Cited

U.S. PATENT DOCUMENTS

| | | | |
|---|---|---|---|
| 5,987,610 A | 11/1999 | Franczek et al. | |
| 6,088,803 A | 7/2000 | Tso et al. | |
| 6,092,194 A | 7/2000 | Touboul | |
| 6,119,165 A | 9/2000 | Li et al. | |
| 6,988,055 B1 * | 1/2006 | Rhea et al. | 702/186 |
| 7,020,574 B2 * | 3/2006 | Eden et al. | 702/122 |
| 2002/0116507 A1 * | 8/2002 | Manjure et al. | 709/229 |
| 2004/0193703 A1 * | 9/2004 | Loewy et al. | 709/220 |
| 2005/0193269 A1 * | 9/2005 | Haswell et al. | 714/38 |
| 2007/0240220 A1 | 10/2007 | Tuvell et al. | |
| 2007/0240221 A1 | 10/2007 | Tuvell et al. | |
| 2007/0240222 A1 | 10/2007 | Tuvell et al. | |
| 2008/0148298 A1 | 6/2008 | Chatterjee et al. | |
| 2008/0209556 A1 * | 8/2008 | Fu et al. | 726/22 |
| 2009/0112880 A1 * | 4/2009 | Oliveira et al. | 707/10 |

OTHER PUBLICATIONS

Llewellyn-Jones D et al.: A security framework for executables in a ubiquitous computing environment, Global Telecommunications Conference, 2004, GLOBECOM '04, IEEE Dallas, TX, USA Nov. 29-Dec. 3, 2004, Piscataway, NJ, USA ,IEEE, Piscataway, NJ, USA LNKD-DOI: 10.1109/GLOCOM.2004. 1378392, vol. 4, Nov. 29, 2004, pp. 2158-2163.

Kalejs, Eriks: "The International Search Report and the Written Opinion of the International Searching Authority", European Patent Office, Rijswijk, completed: Aug. 6, 2010, mailed: Aug. 19, 2010, all pages.

(Continued)

Primary Examiner — Tuan A Vu

(57) ABSTRACT

A network infrastructure element (300) can be configured to, upon determining (101) that an end-user platform (305) seeks to download an executable program, execute (103) the program to develop a corresponding model that represents corresponding operating system call-based behavior. The network infrastructure element can then use (104) this model to vet the operating system call-based behavior of the program with respect to end-user platform policies. When the operating system call-based behavior vets acceptably with respect to these policies, the end-user platform can then be permitted to download (106) the executable program. If desired, the network infrastructure element can provide (107) the model to the end-user platform to permit vetting of the modeled behavior with respect to locally-maintained policies. The model provided to the end-user platform can comprise a size-reduced sliced model.

19 Claims, 4 Drawing Sheets

OTHER PUBLICATIONS

Cadar et al., "EXE: A system for automatically generating inputs of death using symbolic execution," In Proceedings of the 13th ACM Conference on Computer Communications Security; 2006, 20 pages.
Godefroid et al., "DART: Directed Automated Random Testing," SIGPLAN Not., 40(6): 213-223; 2005.
Moser et al., "Exploring Multiple Execution Paths for Malware Analysis," IEEE Symposium on Security and Privacy, 2007; 15 pages.
Brumley et al., "Towards automatic discovery of deviations in binary implementations with applications to error detection and fingerprint generation," In Proceedings of the 16th USENIX Security Symposium, 2007; 16 pages.
Brumley et al., "BitScope: Automatically dissecting malicious binaries," In CMU-CS-07-133, 2007; 20 pages.
Brumley et al., "Automatically Identifying Trigger-Based Behavior in Malware," In Botnet Analysis and Defense, vol. 36 of Advances in Information Security Series, Wenke Lee, Cliff Wang, and David Dagon (editors); 24 pages, 2008.
Blackberry, "The CIO's guide to mobile security," 2006.
Basu, et al., "Generation of all counter-examples for push-down systems." In International Conference on Formal Techniques for Networked and Distributed Systems (FORTE), vol. 2767, pp. 79-94, Berlin, Germany, Sep. 2003.
Christodorescu, "Behavior based malware detection," In Microsoft Tech Talk, Sep. 2005.
Ganesh, et al., "A decision procedure for bit-vectorsand arrays." In Computer Aided Verification (CAV '07), Berlin, Germany, Jul. 2007
Crandall, et al., "On deriving unknown vulnerabilities from zero-day polymorphic and meta-morphic worm exploits," In CCS '05: Proceedings of the 12th ACM conference on Computer and communications security, pp. 235-248, 2005.
King, "Symbolic execution and program testing," Commun. ACM, 19(7):385-394, 1976.
Sekar, et al., "Model-carrying code: a practical approach for safe execution of untrusted applications," SIGOPS Oper. Syst. Rev., 37(5):15-28, 2003.
Miller, Sandra, Defending mobile devices from viruses, spyware, malware; 2007.

* cited by examiner

METHOD AND APPARATUS TO VET AN EXECUTABLE PROGRAM USING A MODEL

TECHNICAL FIELD

This invention relates generally to vetting an executable program with respect to undesired behaviors.

BACKGROUND

End-user platforms that execute computer programs are known in the art. This increasingly includes small and portable platforms such as cellular telephones, personal digital assistants, and so forth. Increasingly, such end-user platforms have considerable processing power. This, coupled with the ready ability to communicatively couple such a platform to remote sources of executable programs, is leading to a corresponding increasing demand for an ability to download executable programs to devices such as a cellular telephone.

Unfortunately, harmful programs are also known in the art. Whether of malicious intent (such as a virus, a worm, or so-called malware of other kind) or owing to mere negligence or misguided thinking, a harmful program downloaded to a susceptible platform can lead to temporarily or permanently disrupted operability, lost data, co-opted functionality, and so forth. Various anti-virus solutions are known in the art to combat these circumstances. Unfortunately, the storage and computational requirements of such approaches tend to render them quite unsuitable for use in the limited-resource setting that typifies a large number and variety of end-user platforms.

As a result, many end users are relegated to downloading content from only certain trusted sources. This, however, prevents the end users from availing themselves of the benefit of a great number and variety of executable programs that can extend in various desirable ways the functionality their platforms. This can and will lead to end-user discontent, frustration, and potentially undesirable behaviors involving unauthorized (and typically ill-advised) attempts to modify their platforms in some manner in order to permit the otherwise unavailable download.

BRIEF DESCRIPTION OF THE DRAWINGS

The above needs are at least partially met through provision of the method and apparatus to vet an executable program using a model described in the following detailed description, particularly when studied in conjunction with the drawings, wherein.

Figure 1:
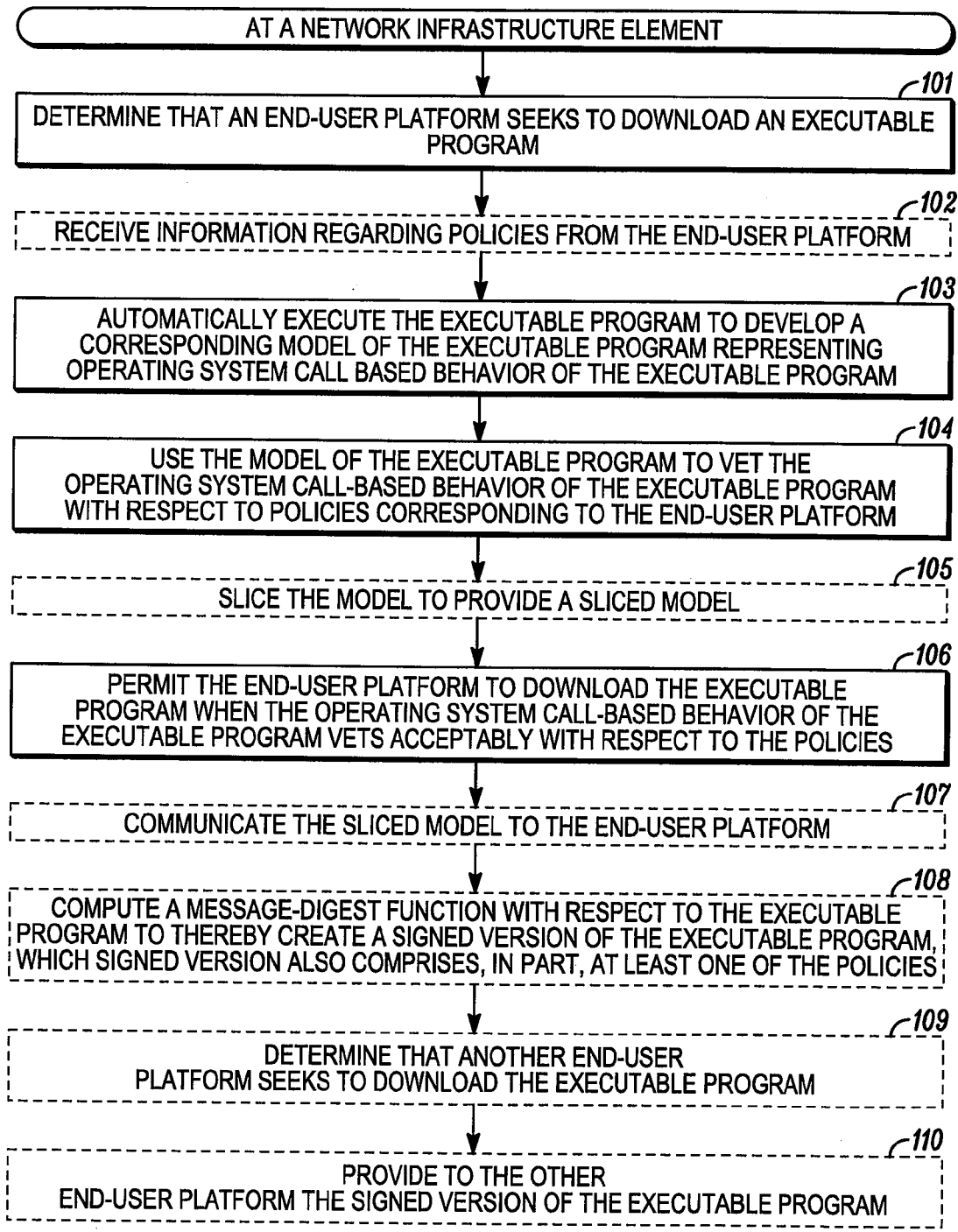
FIG. 1 is a flow diagram as configured in accordance with various embodiments of the invention.

Skilled artisans will appreciate that elements in the figures are illustrated for simplicity and clarity and have not necessarily been drawn to scale. For example, the dimensions and relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

It will further be appreciated that certain actions and steps may be described or depicted in a particular order of occurrence while those skilled in the art will understand that such specificity with respect to sequence is not actually required. It will also be understood that the terms and expressions used herein have the ordinary technical meaning as accorded to such terms and expressions by persons skilled in the technical field as set forth above except where different specific meanings have otherwise been set forth herein.

DETAILED DESCRIPTION

Generally speaking, pursuant to these various embodiments, a network infrastructure element can be configured to, upon determining that an end-user platform seeks to download an executable program, automatically execute the executable program to develop a corresponding model of the executable program that represents operating system call-based behavior of the executable program. The network infrastructure element can then use this model to vet the operating system call-based behavior of the executable program with respect to policies corresponding to the end-user platform. When the operating system call-based behavior vets acceptably with respect to these policies, the end-user platform can then be permitted to download the executable program By one approach, the network infrastructure elements vet the behavior of the executable program with respect to some, but not all, of the policies pertaining to the end-user platform. This can be appropriate, for example, when one or more of the end-user platform's policies contain or allude to confidential content. To accommodate this circumstance, the network infrastructure element can provide the aforementioned model to the end-user platform to thereby permit the latter to now vet the behavior of the executable program (as represented by the model) against those policies that the end-user platform retains only locally and in confidence. To minimize bandwidth requirements, storage requirements, and computational requirements, the model as communicated to the end-user platform can be an abridged version of the model. For example, by one approach, the network infrastructure element can slice the model to provide a sliced model as the abridged version to be provided to the end-user platform.

These teachings will also accommodate, if desired, computing a message-digest function with respect to the executable program to thereby create a signed version of the executable program, which signed version comprises, in part, at least one of the aforementioned policies. In this case, when another end-user platform subsequently seeks to engage the network infrastructure element in a similar activity, the latter need not repeat the initial activity of forming the model and then vetting the executable program with that model. Instead, this signed version of the executable program can be provided to the subsequent end-user platform. The latter can then use the provided policy information to assess the relevance of the previous approval of the executable program to itself and make a corresponding decision regarding downloading of that executable program.

So configured, at least a considerable portion of the vetting process occurs remotely with respect to the end-user platform, hence avoiding an undue challenge to the resource limitations of the latter. The particular vetting approach described herein offers numerous benefits as well. These include the ability to vet a given program even in the absence of so-called signatures that are otherwise typically prerequisites to identifying unwanted behaviors of a given program. These benefits also include the ability to vet a given program in view of very specific operating system call-based policy requirements. Those skilled in the art will appreciate that these teachings are highly scalable and can be used with all manner, size, and type of executable programs. It will further be understood that these teachings can be readily employed in conjunction with existing network architectures, communication protocols, and end-user platforms of various kinds and design.

These and other benefits may become clearer upon making a thorough review and study of the following detailed description. Referring now to the drawings, and in particular to FIG. 1, an illustrative process that is compatible with many of these teachings will now be presented. It will be understood by those skilled in the art that this process 100 can be carried out by a corresponding network infrastructure element such as, but not limited to, a server or the like. Those skilled in the art will understand that this reference to "infrastructure" comprises a reference to the basic technical structures that comprise a given communications network and that provide an enabling intervening capability of facilitating communications amongst and between a plurality of end-user platforms at the edges of such a network.

This process 100 provides the step 101 of determining that a given end-user platform seeks to download an executable program. By one approach, for example, this can comprise receiving a download request sourced by the end-user platform. By one approach, such a request might be initially addressed to the network infrastructure element. By another approach, these teachings can be employed in a somewhat more transparent manner. For example, the downloading request might be otherwise directed or sensed and then intelligently forwarded via an intervening network element to the network infrastructure element that facilitates this process 100. Generally speaking, this determination can include determining the identity of the executable program itself (including, for example and as appropriate, a particular version of that executable program), a particular source (or sources) of this executable program, or some combination thereof. By one approach, such information can comprise a part of the end-user platform's aforementioned download request.

As will be made clearer below, this process 100 makes use of policies pertaining to the end-user platform. By one approach, some or all of these policies may be available to the network infrastructure element via some resource such as a profile server. These teachings will also accommodate, however, the optional step 102 of receiving some or all of this policy information from the end-user platform itself. By one approach this can comprise including such policy information in or with the aforementioned download request. In such a case, the policy information can be directly provided in its entirety or, if desired, can be identified in a coded manner. For example, a number of such policies that tend to be fairly common amongst a relevant user population can each be assigned a corresponding identifying code. In such a case, then, the end-user platform need only provide the identifying codes to thereby apprise the network infrastructure element of the policies to be considered.

Generally speaking, such policies can be categorized into different classes such as an access-control class (dealing with policies that restrict what operations can be performed on objects), an information-flow class (dealing with what a principal can infer about objects from observing a system's behavior), an availability class (dealing with restrictions on principals denying others the user of a resource), a bounded-availability class (dealing with resources that must be released after, for example, a given number of steps, system-invariant holds, and so forth), and so forth. Some illustrative but non-limiting policy examples in these regards are:

Do not send messages after files have been read.
Do not write to some/all files.
Do not write to files other than stdout.
Do not attempt to create a directory.
Do not read from file X.
Do not open more than X files.
Only delete files that are created by the application itself
Do not fork the shell.
Do not execute another (or a particular) program.
Do not create any files other than /tmp.dir.
Do not access a user-specified directory.

As will be appreciated by those skilled in the art, these teachings may have particularly useful application in conjunction with portable/mobile devices (where "portable" devices are understood to comprise devices that are personally portable on or by a person while "mobile" devices are understood to comprise devices that are installed in a vehicle such as an automobile and so forth). Some illustrative (but again non-limiting) examples of policies that are perhaps more specific to such an end-user paradigm would include:

Do not access Short Message Service (SMS) service.
Do not access Multimedia Service (MMS) service.
Do not access DIAL service.
Do not access battery-consuming resources beyond a particular specified limit.
Do not access a directory that contains address-book data.
Do not access Bluetooth service.
Do not allocate an amount of memory in excess of X.

In any event, this process 100 then provides the step 103 of automatically executing the executable code to develop a corresponding model of the executable program that represents the operating system call-based behavior of the executable program (as versus, for example, a model representing library-call behavior or the like). (Those skilled in the art will understand that an "operating system call" comprises the mechanism used by an application program to request service from the operating system being used by a processing platform.) Those skilled in the art will recognize and appreciate that such an approach relies upon use of the binary version of the executable program and hence avoids any need to access the program's source code.

By one approach, this can comprise executing the executable code using random input content (where "random" will be understood to comprise both truly random content as well as pseudo-random content). For example, when a particular step of the executable program requires input such as a name, some random alphanumeric string (limited, perhaps, to no more than a given number of characters) can be provided as a response. As this occurs, the operating system calls being executed by the program can be monitored and recorded to thereby build the substance of the aforementioned model.

By one approach, this evaluation technique can be repeated once, twice, or any number of times (using the same or different input content) to thereby test the behavior of the program in various ways and to explore varying paths through its execution design. (As used here, this reference to "paths" will be understood to refer to a sequence of operating system calls.) The number of execution cycles observed in a given instance can be fixed or, if desired, can vary. For example, the number of execution cycles can vary randomly within some predetermined range representing a minimal number of cycles (such as, for example, 10) and a maximum number of cycles (such as, for example, 1,000,000). As another approach in these regards, time limits can be utilized to govern this activity. For example, one time limit can be imposed for each execution cycle, and another time limit (such as, for example, five minutes) can apply with respect to the complete process. Such an approach can serve to avoid complications that might arise should a given execution cycle enter an infinite loop. Again, the corresponding operating system calls can be monitored and recorded to further develop and enrich the executable program model.

There are various ways to capture the behavior of the executable program to develop this model. By one approach, for example, this process 100 will accommodate executing the program in a virtual environment (using, for example, a virtualization environment program such as QEMU) and capturing the instructions as they are executed using a program such as PTRACE ("Process Trace"). Using such an approach, the model can essentially comprise a graph whose nodes correspond to the operating system calls executed by the program and whose edges correspond to the control flow between the system calls. Such a graph can be built by aggregating captured operating system calls as they execute in various paths of the program.

As noted above, the development of the model can rely upon dynamically and automatically provided input to the program as it executes. A technique such as concolic execution can be used to support this approach. Concolic execution, here, uses a constraint solver such as Stanford's STP to generate values to provide as program input variables (which, as noted above, can comprise random inputs) to thereby explore various program paths.

This process 100 then provides the step 104 of using this model of the executable program to vet the operating system call-based behavior of the executable program with respect to policies corresponding to the end-user platform. When the policies themselves are expressed in terms of prohibited operating system calls, this vetting can comprise searching the model for examples of a prohibited operating system call. When the policies are not expressed in terms of prohibited operating system calls, this process can include converting each policy, to the extent possible, into an expression of one or more corresponding operating system calls and then using these derived results to inform the assessment of the model.

When this step 104 reveals a policy (or some threshold number of policies) that the executable program seemingly violates, this process 100 can essentially conclude. This conclusion can include such corresponding actions as may be desired. For example, a notice can be provided to the end-user platform to deny the downloading activity or to at least provide notice that the executable program appears to represent a threat to the integrity of the end-user platform. As another example, these results can be saved (or provided to another repository for such information) to permit reuse of these results when servicing subsequent related downloading requests or inquiries.

When the operating system call-based behavior of the executable program vets acceptably with respect to these policies, this process 100 can then provide the optional step 105 of abridging the model to provide an abridged version of the model. By one approach this can comprise, for example, slicing the model to provide a sliced model. Slicing is a known practice in the art and will be understood to comprise, at the least, deleting information in the model pertaining to paths that are not dependent on operating system calls of interest. By one approach, this slicing can be based upon a set of operating system calls that are known to be of interest either based upon the policies as may have previously been provided by the end-user platform or based upon one or more actual operating system calls that the end-user platform may have provided to the network infrastructure element as a part of this step 105 or as a part of some earlier step.

As slicing comprises a known technique, further elaboration in these regards will not be provided here. As a modern, not-untypical cellular telephone operating system can support upwards of 300 or so operating system calls, eliminating uninteresting paths can result in a considerable size reduction.

In any event, this process 100 then provides the step 106 of permitting the end-user platform to download the executable program. Generally speaking, this step of "permitting" presumes that the end-user platform requires the corresponding permission in order to download the executable program and that in the absence of such permission the end-user platform cannot accomplish the downloading activity. This "permission" can comprise, by one approach, notifying the end-user program of the aforementioned results. This may also comprise, in lieu of the foregoing or in combination therewith, notifying the source of the executable program that the program may be downloaded to the end-user platform. By yet another approach, the network infrastructure element may itself serve as a source for the executable program.

As alluded to earlier, the policies vetted by the network infrastructure element as described above may, or may not, include all of the policies that may be of concern to the end-user platform. In many cases, in fact, it is anticipated that the end-user platform may have some policies that are retained in confidence in order to avoid compromising sensitive information. In such a case, there exists the possibility that the described vetting process will find an unacceptable program to be acceptable as the network infrastructure element lacks the necessary vetting content.

To meet such a need, this process 100 will also support, if desired, the step 107 of communicating the model to the end-user platform. When implementing this approach, it will likely be useful in many application settings to provide the aforementioned sliced model to the end-user platform rather than the complete model. The reduced size and complexity of the sliced model will present less of a burden to the bandwidth limitations that may characterize the network connection for the end-user platform. The sliced model may also represent a reduced computational load that better comports with the limited processing or power resources of the end-user platform.

It is not unlikely that other end-user platforms will eventually express a similar interest in the vetted executable program. This process 100 will be understood to readily accommodate retaining the results of the vetting process in order to facilitate reusing those results when providing subsequent responses to other end-user platforms. There may be times, however, when end-user platforms have differing policies. One end-user platform, for example, may be particularly sensitive to calls that seek to utilize a native Bluetooth capability while another end-user platform may lack such a capability and have no concern whatsoever regarding such a policy.

To meet such a contingency, this process 100 will also optionally accommodate the step 108 of computing a message-digest function with respect to the executable program to thereby create a signed version of the executable program (using, for example, HAB (High Assurance Boot) technology), wherein the signed version also comprises, at least in part, one or more of the policies used when vetting the executable program. The general creation of signed versions comprises a well-understood area of endeavor and requires no further elaboration here.

So configured, this process 100 will then also optionally support the steps 109 and 110 of, upon determining that another end-user platform seeks to download this executable program, providing to that end-user platform the signed version of the executable program. This end-user platform can then assess the policy content of that signed version to determine an extent to which the verified status of the executable program is, in fact, relevant to its own policy standards. When, for example, this end-user platform concludes that the present approval is inadequate to its own requirements, this end-user platform can request that the network infrastructure element compare the model against one or more additional policies as provided or identified by this end-user platform.

Figure 2:
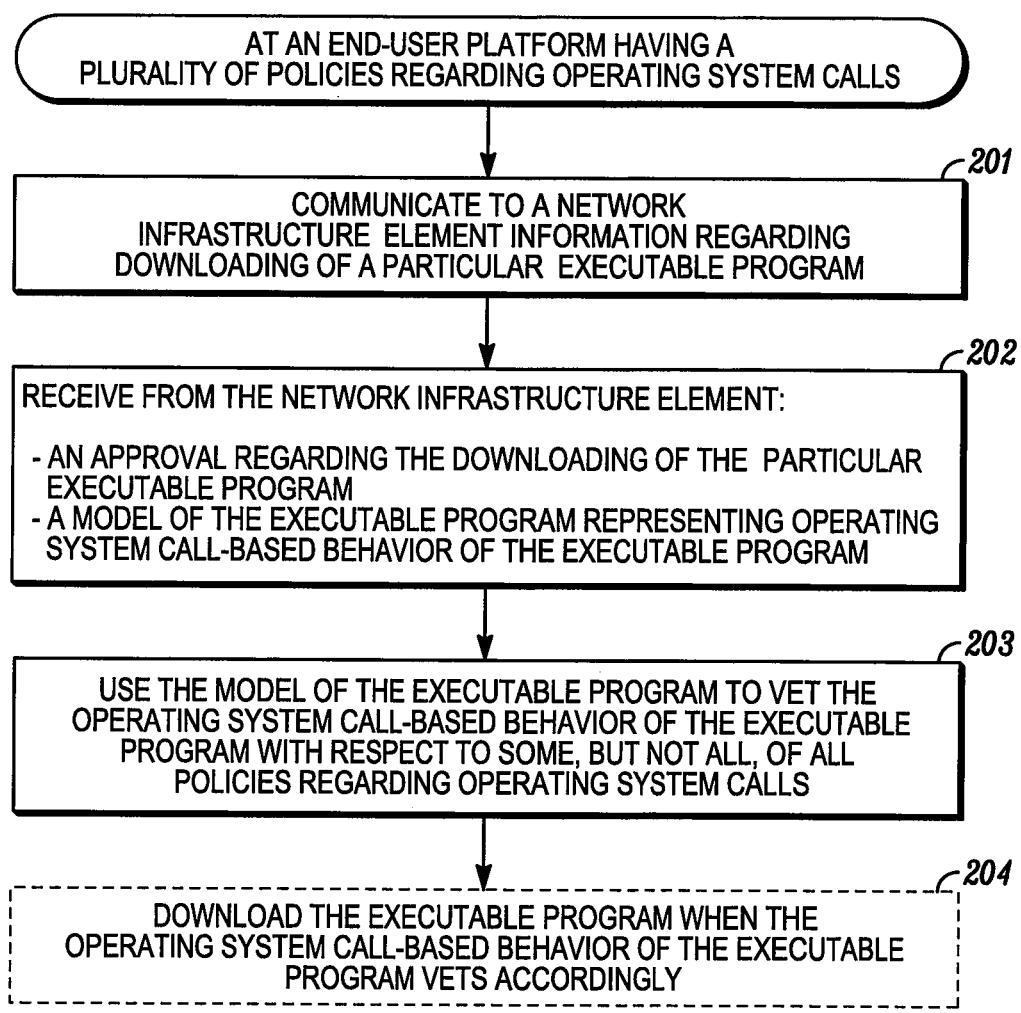
FIG. 2 is a flow diagram as configured in accordance with various embodiments of the invention.

Referring now to FIG. 2, a complimentary process 200 suitable for execution by an end-user platform having a plurality of policies regarding operating system calls will be described.

This process 200 provides the step 201 of communicating to a network infrastructure element information regarding downloading of a particular executable program as described above. As noted, if desired, this information can comprise, at least in part, information regarding some, though not all if desired, of the policies regarding operating system calls that are of concern to this end-user platform.

This process 200 can then also provide the step 202 of receiving from the network infrastructure element an approval regarding the downloading of the executable program (when such is the result of the network infrastructure element's vetting of the executable program as described above). This approval can be as explicit/direct or implicit/indirect as may be desired and as may suit the needs or opportunities characterizing a given application setting. This step 202 will also accommodate receiving a model of the executable program as described above if desired. This can comprise, for example, the aforementioned sliced model.

In such a case, this process 200 can then also provide the step 203 of using the received model to itself vet the operating system call-based behavior of the executable program with respect to some, but not all, of its policies. Generally speaking, the end-user platform need only vet those particular policies that it ordinarily retains in confidence and which it has not shared with, for example, the network infrastructure element. This, in turn, can tend to use only a minimal amount of time and on-board resources to complete the vetting task.

When this local vetting process yields acceptable results pertaining to the operating system call-based behavior of the executable program, this process 200 can then (optionally) provide for downloading the executable program to the end-user platform. The downloading source can vary as noted above. It would also be possible, if desired, to configure the end-user platform to download some or all of the executable program prior to concluding the vetting process under controlled circumstances that maintain the downloaded content in an isolated and unexecuted state pending the results of the local vetting process.

Figure 3:
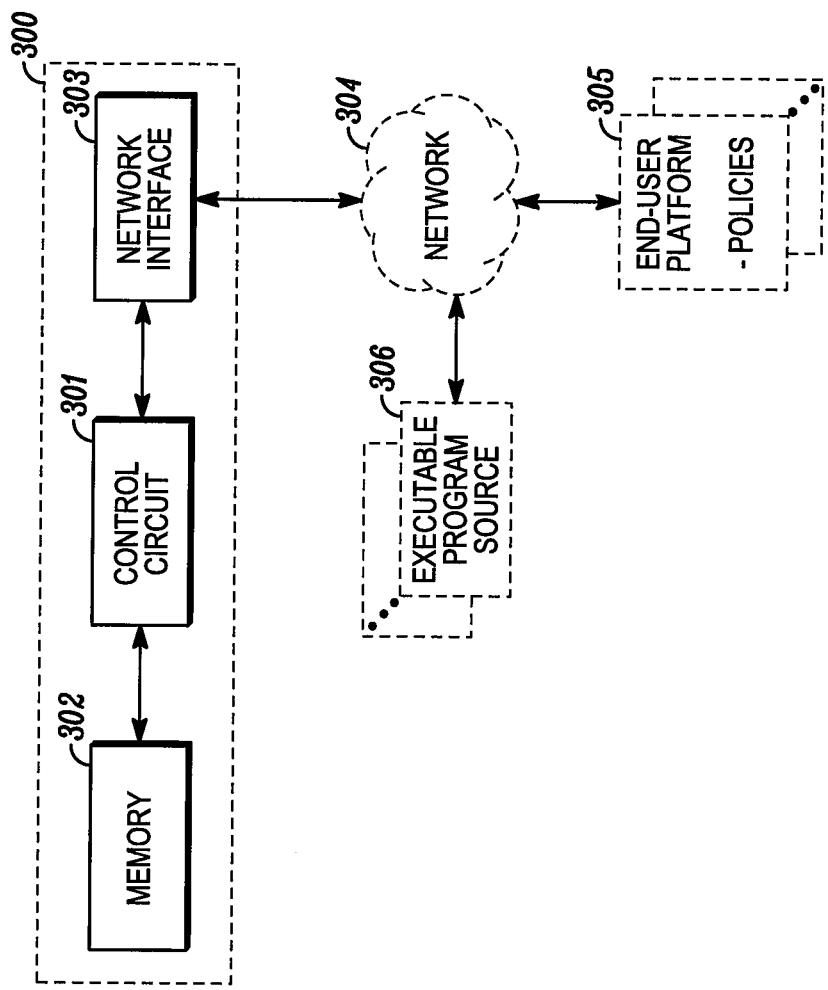
FIG. 3 is a block diagram as configured in accordance with various embodiments of the invention.

Those skilled in the art will appreciate that the above-described processes are readily enabled using any of a wide variety of available and readily-configured platforms, including partially or wholly-programmable platforms as are known in the art or dedicated-purpose platforms as may be desired for some applications. Referring now to FIG. 3, an illustrative approach to such platforms will now be provided.

In this illustrative example, the network infrastructure element 300 comprises a control circuit 301 that operably couples to both a memory 302 and a network interface 303. The memory 302 can comprise, in whole or in part, a discrete physical component or can be partially or fully integrated with the control circuit 301. It will also be understood that this memory 302 can comprise a plurality of memory elements or can comprise a single component (as is suggested but not mandated by the illustration). This memory 302 can serve, for example, to store the aforementioned policies, the executable program, the nascent developing model of the executable program, the final model of the executable program, the sliced version of the program, or the results of the vetting process as desired.

The network interface 303, in turn, operably couples to one or more networks 304 (such as, but not limited to, the Internet via a direct or indirect pathway). So configured, the network infrastructure element 300 can operably couple to end-user platforms 305 or one or more executable program sources 306 via these networks 304 to facilitate the various communications and exchanges described herein. Various networks and architectural arrangements are very well known in the art. As these teachings are not overly sensitive to any particular selections in these regards, for the sake of brevity and the preservation of clarity, further elaboration in these regards will not be presented here.

Those skilled in the art will recognize and appreciate that the control circuit 301 can comprise a fixed-purpose hard-wired platform or can comprise a partially or wholly-programmable platform. All of these architectural options are also well known and understood in the art and again require no further description here.

So configured, the control circuit 301 can be configured (using, for example, corresponding programming as will be well understood by those skilled in the art) to carry out one or more of the actions, steps, or functionality described herein. This can comprise, for example, configuring the control circuit 301 to make the described determination that the end-user platform 305 seeks to download an executable program, automatically execute the executable program to develop the corresponding model of the executable program representing operating system call-based behavior of the executable program, use the model to vet the operating system call-based behavior of the executable program with respect to policies corresponding to the end-user platform, and permit the end-user platform 305 to download the executable program when the operating system call-based behavior of the executable program vets acceptably with respect to these policies.

In a similar manner, the end-user platform 305 can be configured to carry out one or more of the end-user actions, steps, or functionality as are described herein.

Those skilled in the art will recognize and understand that such an apparatus 300 may comprise a plurality of physically distinct elements as suggested by the illustration shown in FIG. 3. It is also possible, however, to view this illustration as comprising a logical view, in which case one or more of these elements can be enabled and realized via a shared platform.

Figure 4:
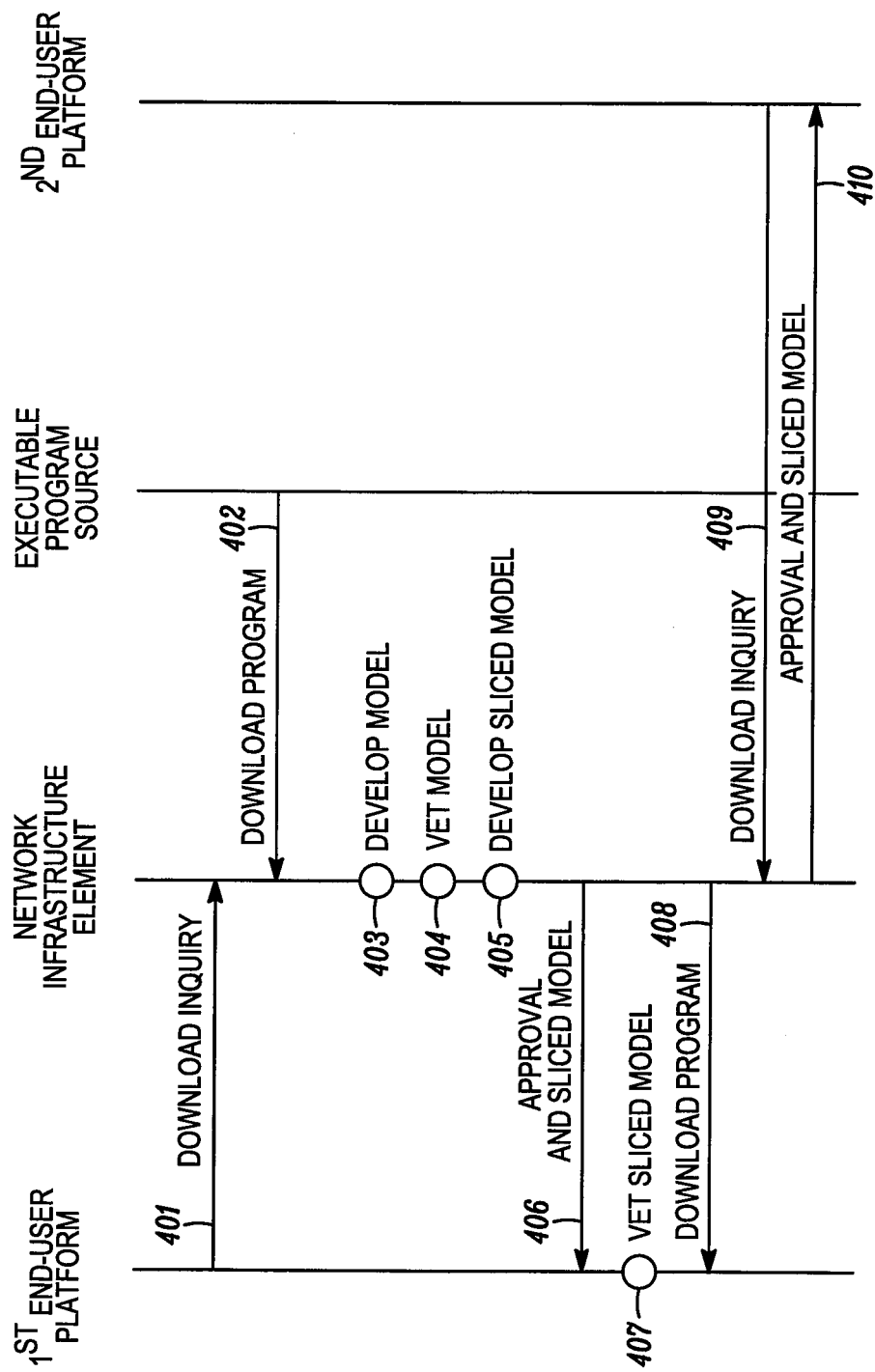
FIG. 4 is a call-flow diagram as configured in accordance with various embodiments of the invention.

By way of illustration and without intending any limitations in these regards, an example use case will now be presented. Referring to FIG. 4, a $1^{st}$ end-user platform sources a message 401 comprising a download inquiry that identifies a particular executable program and that further includes a number of the end-user platform's policies pertaining to operating system calls. This message 401 is provided to a network infrastructure element which then accesses a corresponding executable program source and downloads 402 the identified program.

The network infrastructure element then develops 403 a model as described herein (using that downloaded executable program) and vets 404 that model against the end-user platform's policies. When this vetting leads to unacceptable results, the network infrastructure element can take one or more actions (not shown) to deny or otherwise discourage downloading of the program by the end-user platform.

When the vetting process 404 leads to acceptable results, in this illustrative example the network infrastructure element develops 405 a sliced version of the model and then provides that sliced model and a corresponding approval message 406 to the 1st end-user platform. The 1st end-user platform, in turn, then uses 407 that sliced model to vet any remaining policies that are of interest to the end-user platform in these regards and that were not already accessed by the network infrastructure element. When this second vetting process again yields successful results, the 1st end-user platform then downloads the executable program 408 as per the original intent and aim.

In this illustrative example, at some later time (for example, minutes or days later), a 2nd end-user platform poses a similar download inquiry message 409 to the network infrastructure element. In this case, however, rather than repeat the aforementioned model development and vetting activity, the network infrastructure element (upon determining that this 2nd end-user platform is, indeed, seeking to download the previously vetted program), simply forwards to the 2nd end-user platform an approval message 410 in conjunction with the sliced model. By one approach, if desired, this abbreviated approach may be conditioned upon determining that the policies for the 2nd end-user platform are sufficiently similar to the policies against which the previously-developed model was vetted. The sliced model provided to the 2nd end-user platform may be the same as the sliced model originally provided 406 by the network infrastructure element to the 1st end-user platform or, if desired, the sliced model provided to the 2nd end-user platform can differ. For example, it may be appropriate to provide the 2nd end-user platform with a different sliced model when it is known to the network infrastructure element that the 2nd end-user platform has one or more differing system calls of interest.

So configured, end-user platforms can greatly expand their universe of available executable program sources without requiring a commensurate significant increase in local vetting capabilities. The processes described herein do not require accessing source code and are particularly useful to vet operating system calls that comprise, or relate to, policies of interest to the end-user platform. These teachings are highly scalable, are able to readily leverage presently available techniques, architecture, and processing capabilities, and are respectful of bandwidth limitations characterizing many network application settings.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one example in these regards, the policies first employed by the network infrastructure element can comprise a generic set of policies that are presumed or known to be relevant to a given class or group of end-user platforms. Such a generic set of policies can be available, in whole or in part, via a native and local resource pertaining to the network infrastructure element or can be obtained, in whole or in part, from a remote resource such as a policy server that provides such a service. In such a case, the end-user platform may, or may not, further supplement that generic set of policies with one or more additional policies (though perhaps excluding, again, policies that may contain or otherwise represent confidential information).

We claim:

1. A method for supporting download of a executable program to an end-user using a network infrastructure element, comprising:

in response to detecting an end-user platform seeking to download an executable program, at a network infrastructure element, performing:

determining, by the infrastructure element, that the end-user platform seeks to download the executable program;

receiving by the infrastructure element, information regarding policies associated with the end-user platform, the policies regarding acceptable behavior for operation of the executable program on the end-user platform;

executing by the infrastructure element, the executable program to monitor operating system call-based behavior of the executable program when the executable program makes calls to an operating system running on the network infrastructure element, the operating system call-based behavior forming a corresponding model of the executable program;

wherein the model formed from the operating system call-based behavior reflects the policies associated with the end-user platform regarding acceptable operation of the executable program when the executable program would be executing within the end-user platform;

using by the infrastructure element, the model of the executable program to vet the operating system call-based behavior of the executable program with respect to the policies corresponding to the end-user platform to determine if the executable program will operate within the acceptable behavior if downloaded and executed on the end-user platform; and if the vetting of the executable program is acceptable with respect to the policies, permitting by the infrastructure element, the end-user platform to download the executable program.

2. The method of claim 1 wherein determining that the end-user platform seeks to download an executable program comprises receiving a download request sourced by the end-user platform.

3. The method of claim 1 wherein executing the executable program to monitor operating system call-based behavior of the executable program comprises executing the executable program using random input content.

4. The method of claim 1 wherein executing the executable program to monitor operating system call-based behavior of the executable program comprises executing the executable program a plurality of times using automatically generated differing input content.

5. The method of claim 1 further comprising:

slicing the model to provide a sliced model; and wherein permitting the end-user platform to download the executable program also comprises communicating the sliced model to the end-user platform.

6. The method of claim 1 further comprising, when the operating system call-based behavior of the executable program vets acceptably with respect to the policies:

computing a message-digest function with respect to the executable program to thereby create a signed version of the executable program, which signed version also comprises, in part, at least one of the policies.

7. The method of claim 6 further comprising:

determining that another end-user platform seeks to download the executable program; and providing to the other end-user platform the signed version of the executable program.

8. The method of claim 1 further comprising if the vetting of the executable program is not acceptable with respect to the policies, not permitting the end-user platform to download the executable program.

9. The method of claim 1 further comprising if the vetting of the executable program is not acceptable with respect to the user-sent policies, outputting an indication the executable program is not acceptable for download.

10. A network system for supporting download of a executable program to an end-user using a network infrastructure element, comprising:
    an end-user platform having a plurality of policies regarding acceptable behavior for operation of the executable program on the end-user platform; and
    a network infrastructure element having a memory and a control circuit operably coupled to the memory, the control circuit in response to detecting an end-user platform seeking to download an executable program, the network infrastructure element being configured to:
    determine that the end-user platform seeks to download the executable program;
    receive information regarding policies associated with the end-user platform, the policies regarding acceptable behavior for operation of the executable program on the end-user platform;
    execute the executable program to monitor operating system call-based behavior of the executable program when the executable program makes calls to an operating system running on the network infrastructure element, the operating system call-based behavior forming a corresponding model of the executable program;
    use the model of the executable program to vet the operating system call-based behavior of the executable program with respect to the policies corresponding to the end-user platform to determine if the executable program will operate within the acceptable behavior if downloaded and executed on the end-user platform; and
    if the vetting of the executable program is acceptable with respect to the policies, permit the end-user platform to download the executable program,
    wherein the model formed from the operating system call-based behavior reflects the policies associated with the end-user platform regarding acceptable operation of the executable program when the executable program would be executing within the end-user platform.

11. The network system of claim 10 wherein the control circuit is further configured to determine that the end-user platform seeks to download the executable program by receiving, via the network interface, a download request sourced by the end-user platform.

12. The network system of claim 10 wherein the control circuit is further configured to execute the executable program to monitor operating system call-based behavior of the executable program by executing the executable program using random input content.

13. The network system of claim 10 wherein the control circuit is further configured to execute the executable program to monitor operating system call-based behavior of the executable program by executing the executable program a plurality of times using automatically generated differing input content.

14. The network system of claim 10 wherein the control circuit is further configured to slice the model to provide a sliced model, and wherein the control circuit is further configured to permit the end-user platform to download the executable program by also communicating the sliced model to the end-user platform.

15. The network system of claim 10 wherein the control circuit is further configured to, if the vetting of the executable program is not acceptable with respect to the policies, not permit the end-user platform to download the executable program.

16. The network system of claim 10 wherein the control circuit is further configured to, if the vetting of the executable program is not acceptable with respect to the user-sent policies, output an indication the executable program is not acceptable for download.

17. A method for vetting an executable program downloaded from a network infrastructure element, comprising:
    at an end-user platform, storing a plurality of policies regarding acceptable behavior for operation of the executable program on the end-user platform,
    communicating, by the end-user platform, to a network infrastructure element information regarding downloading of the executable program;
    receiving by the end-user platform, from the network infrastructure element:
    an approval regarding the downloading of the executable program; and a model of the executable program representing operating system call-based behavior of the executable program when the executable program makes calls to an operating system running on the network infrastructure element, wherein the approval is based on vetting of the operating system call-based behavior of the executable program using a first portion of the plurality of policies to determine if the executable program will operate within the acceptable behavior if downloaded and executed on the end-user platform; and
    using by the end-user platform, the model of the executable program to vet the operating system call-based behavior of the executable program with respect to a second portion of the policies regarding operating system calls;
    wherein network infrastructure generates the model representing operating system call-based behavior by:
    receiving, responsive to the end-user request for the executable program, by the infrastructure element, information regarding policies associated with the end-user platform, the policies regarding acceptable behavior for operation of the executable program on the end-user platform;
    executing by the infrastructure element, the executable program to monitor operating system call-based behavior of the executable program when the executable program makes calls to an operating system running on the network infrastructure element, the operating system call-based behavior forming a corresponding model of the executable program;
    wherein the model reflecting the policies associated with the end-user platform regarding acceptable operation of the executable program running in the context of the end-user operating system;
    using by the infrastructure element, the model of the executable program to vet the operating system call-based behavior to determine if the executable program will operate within the acceptable behavior if downloaded and executed on the end-user platform; and
    permitting by the infrastructure element, the end-user platform to download the executable program based on the acceptable result from the vetting.

18. The method of claim 17 wherein communicating to a network infrastructure element information further comprises communicating to the network infrastructure element information regarding the first portion of the policies regarding operating system calls to thereby permit the network infrastructure element to vet the second portion of the policies against the operating system call-based behavior of the executable program.

19. The method of claim 17 further comprising:
downloading the executable program when the operating system call-based behavior of the executable program vets acceptably.

* * * * *